US 8,495,088 B2

(12) United States Patent
Mooney

(10) Patent No.: US 8,495,088 B2
(45) Date of Patent: Jul. 23, 2013

(54) QUICK PARTS LIST—PANEL SUB FINDER

(75) Inventor: Reese Mooney, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/246,852

(22) Filed: Sep. 27, 2011

(65) Prior Publication Data
US 2012/0117108 A1 May 10, 2012

Related U.S. Application Data

(60) Provisional application No. 61/412,013, filed on Nov. 10, 2010.

(51) Int. Cl.
G06F 7/00 (2006.01)
G06F 17/30 (2006.01)

(52) U.S. Cl.
USPC .......................................................... 707/769

(58) Field of Classification Search
USPC .......................................................... 707/769
See application file for complete search history.

(56) References Cited

U.S. PATENT DOCUMENTS

| 6,243,725 | B1 | 6/2001 | Hempleman et al. |
| 6,944,515 | B2 | 9/2005 | Nakajima et al. |
| 2002/0055893 | A1 | 5/2002 | Mizumachi et al. |
| 2003/0182311 | A1 | 9/2003 | Nakajima et al. |
| 2004/0167833 | A1 | 8/2004 | Schickler |
| 2006/0167711 | A1 | 7/2006 | Chakraborty et al. |
| 2006/0167760 | A1 | 7/2006 | Chakraborty et al. |
| 2006/0190342 | A1* | 8/2006 | Dendl et al. ............. 705/26 |
| 2007/0162288 | A1 | 7/2007 | Springhart et al. |
| 2007/0282709 | A1 | 12/2007 | Rupp |

OTHER PUBLICATIONS

Oracle® Bill of Material User Guide Release 11i vol. 1 Jan. 2000, Oracle®.*

* cited by examiner

Primary Examiner — Kuen Lu
(74) Attorney, Agent, or Firm — Fitch, Even, Tabin & Flannery LLP

(57) ABSTRACT

The instant invention provides a method, executable by a processor based device, that eliminates the need to manually look up a list of support parts to determine the stock availability of one or more replacement part alternatives, based at least in part on the stock availability of one or more support parts for the one or more replacement part alternatives.

15 Claims, 4 Drawing Sheets

FIGURE 2

| Panel Supplier | Run | Part | Panel In Stock | Supporting Part | Run | In Stock | Available as Alternative |
|---|---|---|---|---|---|---|---|
| Sony | A | Panel | N | Connector | A | N | N |
|  |  |  |  | BU board | A | N |  |
| AUO | B | Panel | N | Connector | B | Y | N |
|  |  |  |  | BU board | B | Y |  |
| Samsung | C | Panel | Y | Connector | C | Y | Y |
|  |  |  |  | BU board | C | Y |  |
| Sharp | D | Panel | Y | Connector | D | Y | N |
|  |  |  |  | BU board | D | N |  |

200

Supplier Name (210)
Run Label (220)
Part Label (230)
Part Availability Indicator (240)
Support Part Label (250)
Support Part Availability Indicator (260)
Availability Indicator (270)

QUICK PARTS LIST—PANEL SUB FINDER

This application claims the benefit of U.S. Provisional Application No. 61/412,013, filed Nov. 10, 2010, which is incorporated herein by reference.

FIELD OF INVENTION

The present invention relates to a method and apparatus for automatically identifying the availability of one or more replacement parts and associated support parts. More specifically, the instant invention eliminates the need to manually look up a list of support parts to determine the stock availability of one or more replacement part alternatives, based at least in part on the stock availability of one or more support parts for the one or more replacement part alternatives.

BACKGROUND OF THE INVENTION

In order to reduce costs associated with the manufacture of a given product, manufacturers will often produce multiple versions of the same product model that comprise similar parts provided by different suppliers. These different product versions are sometimes referred to as "model runs." Typically a given part from a particular model run may serve as an adequate replacement for a corresponding part from a different model run due to the fact that technical specifications are highly similar. However, there are variations between replacement parts that must first be taken into consideration before a specific replacement part is determined to be suitable. For example, corresponding parts as between different model runs may require different support parts (such as cables, connectors, etc.). Thus, before one can determine the availability of a suitable replacement part, the stock availability of the replacement part itself, as well as the stock availability of all corresponding support parts, must first be determined. Conventionally, this determination must be performed through a manual look-up process that is often tedious and time consuming.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure:

FIG. 2. illustrates a table used for indicating the availability of a part and a supporting part according to one embodiment of the present invention;

DETAILED DESCRIPTION

Reference will now be made in detail to certain embodiments of the present disclosure, examples of which are illustrated in the accompanying figures.

Figure 1:
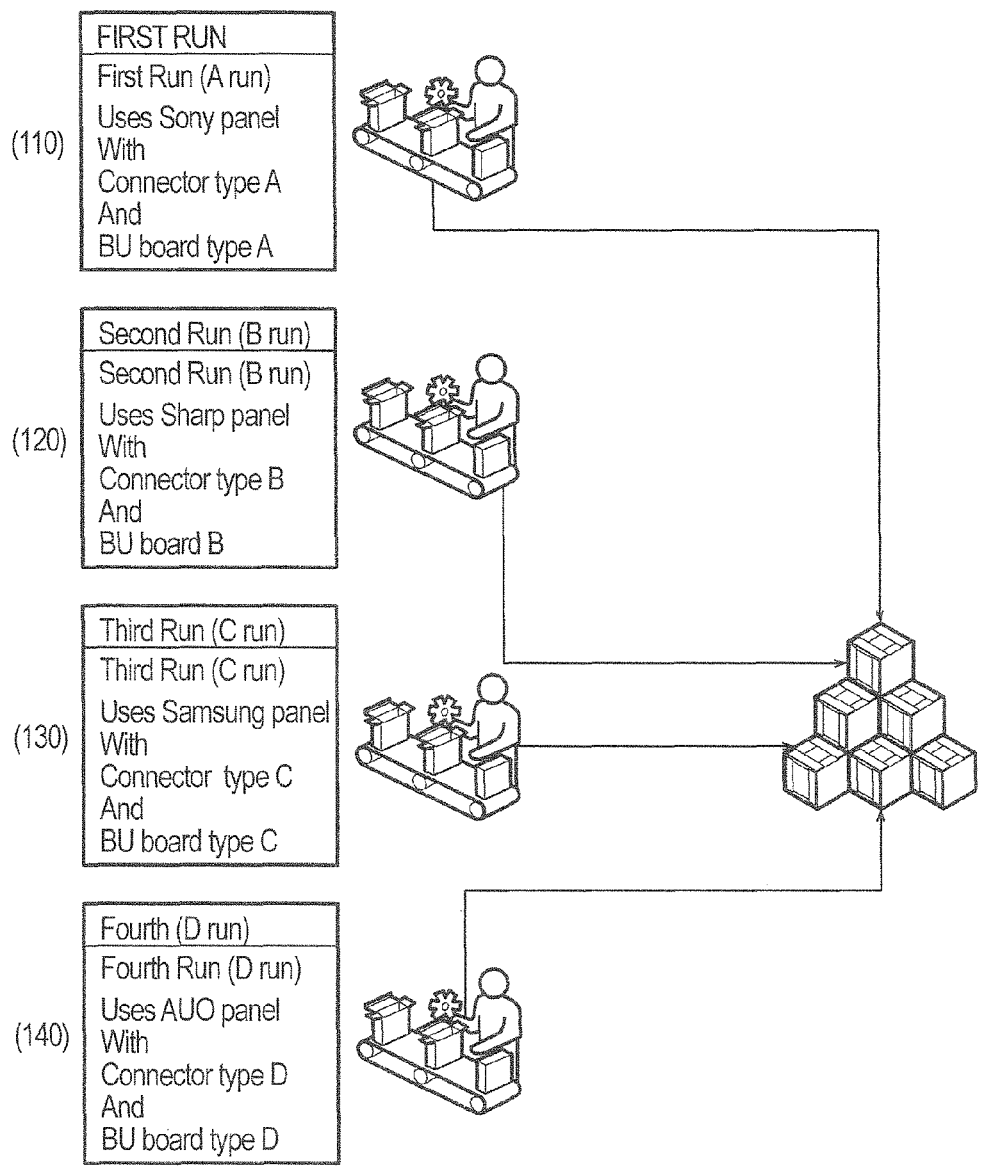
FIG. 1 is a prior-art illustration of the "model-run" manufacturing process.

FIG. 1 illustrates a prior art manufacturing process wherein the manufacture of a particular model is separated into four independent "model runs." Specifically, FIG. 1 illustrates a first run 110, a second run 120, a third run 130, and a fourth run 140. As would be understood by one of skill in the art, each listed run may be used for the manufacturing of different versions of the same product model, using an assembly list of different, but fungible parts.

As illustrated, each particular "run" uses a different panel type and corresponding support parts. For example, the first run 110 comprises a Sony panel part that requires specific corresponding support parts, i.e., connector type 'A' and BU board type 'A.' The second run 120 comprises a Sharp type panel that uses connector type 'B' and BU board type 'B.' The third run 130 comprises a Samsung type panel with connector type 'C' and BU board type 'C.' The fourth run 140 comprises an AUO panel with connector type 'D' and BU board type 'D.' As would be understood by one of skill in the art, the panel part from one run may serve as a suitable replacement for the panel of another run.

The interchangeability of parts between runs serves to mitigate overall manufacturing costs by increasing the availability of suitable replacement part alternatives. However, before making the determination that a particular panel from a particular model run will serve as a suitable replacement for another, one must first determine whether the associated support parts (connector and BU board) are similarly available. The conventional method of determining availability requires the manual lookup of replacement and support part compatibility.

FIG. 2 illustrates a decision table display 200 for depicting the availability of one or more part, as well as one or more supporting part, according to one embodiment of the invention.

Specifically, the chart of FIG. 2 depicts columns for the following informational items: a supplier name 210, a run label 220, a part label 230, a part availability indicator 240, a support part label 250, support part availability identifier 260 and an availability indicator 270. As will be discussed in further detail below, the determination as to whether a particular replacement part is available as an alternative is a function of the availability of the part in question, as well as the availability of all of the supporting parts.

By way of example, the decision table display 200 indicates the supplier name 210 in the first column together with the corresponding run label 220, part availability indicator 240, supporting part label 250 and support part availability identifier 260. In preferred embodiments of the invention, the decision table display 200 may be displayed by essentially any suitable display device. It should be appreciated that the information items of the decision table display 200 may be displayed in essentially any arrangement; for example, the information items of the decision table display 200 may be displayed alone or in a grouping determined by the user.

The availability indicator 270 is determined based upon the stock availability of the support part indicated in the support part availability identifier 260 column. For example, with respect to the Sony supplied "run A" panel part as indicated by the part label 230—this part is indicated as unavailable ('N') as an alternative by the availability indicator 270. This determination is made based on the unavailability of the replacement part as indicated by the part availability indicator 240 and furthermore, by the unavailability of the supporting parts (connector A and BU board A) as indicated by the support part availability identifier 260.

By way of further example, turning to the Sharp supplied "run D" (as indicated by the supplier name 210 and corresponding run label 220). The panel availability is indicated as unavailable ('N') in the corresponding availability indicator 270 although the panel itself is indicated as in stock ('Y') by the part availability indicator 240. In this example, the availability indicator 270 'N' (i.e., that the panel part is not available as an alternative) is determined as a result of the unavailability of all supporting parts, as indicated by the corresponding support part availability identifier 260. Specifically, although the corresponding "connector" is determined to be available 'Y' as indicated by the support part availability identifier 260, the "BU board" is determined to be unavailable. Thus, because not all of the support parts are available for the requested panel (i.e., the BU Board) availability indicator 270 for this part is indicated as 'N.'

By way of another example, with respect to the Samsung "run C" (as indicated by the supplier name 210 and corresponding run label 220). For this particular run, the panel availability is indicated as available 'Y' in the corresponding availability indicator 270. In this particular example, the determination of the availability indicator 270 'Y' (i.e., that the panel part is an available alternative) is based on the availability of the part (as indicated by the part availability indicator 240 'Y') as well as the availability of all supporting parts; that is, the availability of the corresponding connector and BU board as indicated by the support part availability identifier 260.

Figure 3:
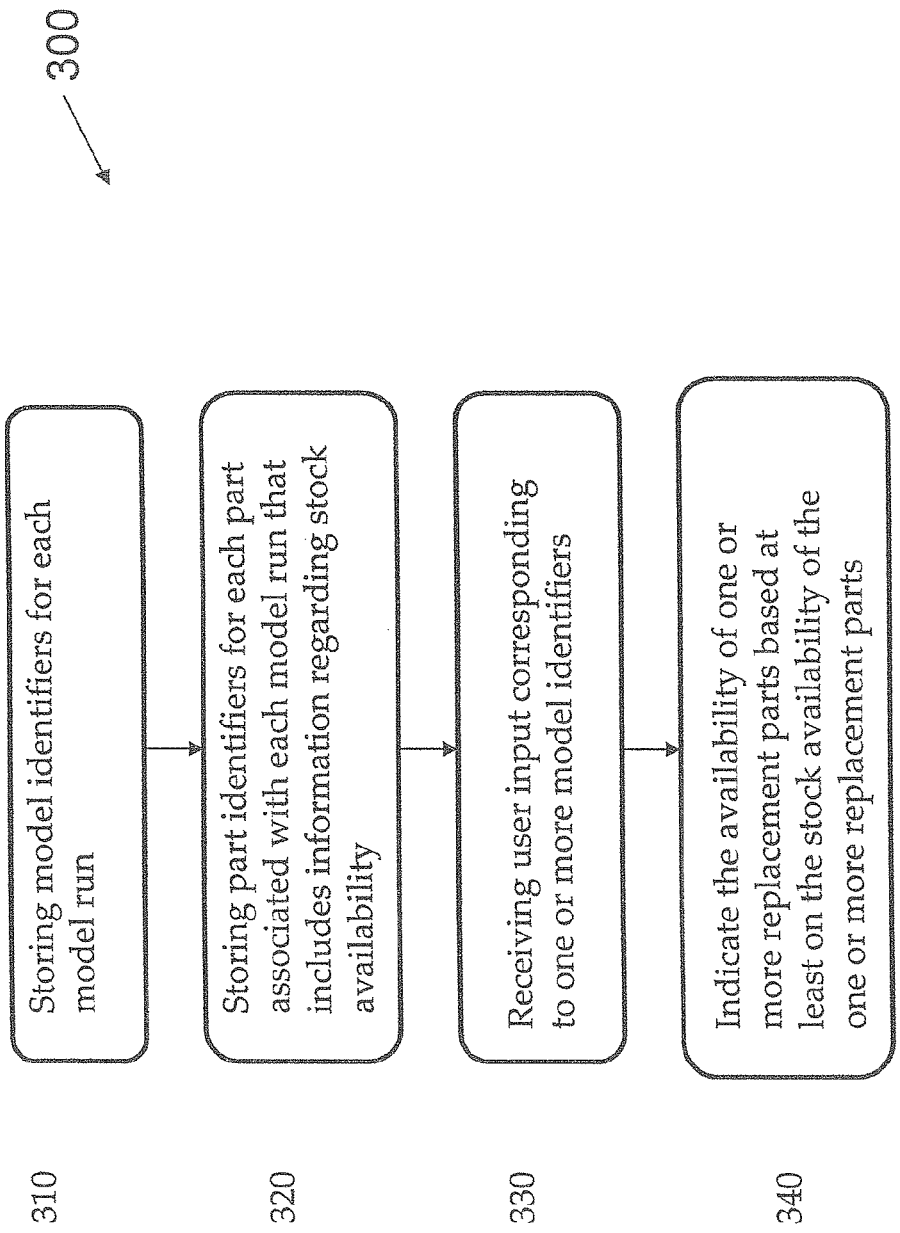
FIG. 3 is a flow diagram depicting the steps of a method for determining the availability of one or more replacement parts according to one embodiment of the present invention.

FIG. 3 is a flow diagram of the steps of a method 300 for determining the availability of an alternative part according to one embodiment of the present invention. The method begins in step 310 wherein model identifiers for each run are stored onto a tangible computer readable memory device (not shown). The memory device may comprise essentially any type of computer readable memory medium, including but not limited to flash memory, magnetic memory or optical memory media such as DVD, BluRay disc, CD-ROM, etc.

In preferred embodiments, the memory device is electrically connected to a microprocessor; for example, the memory could be part of a personal computer or other computing device such as a server. In some preferred embodiments of the invention, the memory device will contain data structures for use as part of a database. By way of example, the information stored on the memory device could comprise at least a portion of a SQL database or essentially any type of computer readable database.

In some embodiments the model identifier may pertain to a specific product model type. In some embodiments the model identifier may pertain to the particular supplier used for a given model run; for example, the model identifier may identify supplier/s of a given part/s such as "Sony" or may comprise some other identifying sequence of characters and/or numbers.

In step 320 the part identifiers for each part associated with each model run are stored to the memory device. In step 330 user input is received corresponding to one or more identifiers. Specifically, the user input will identify one or more of the stored model identifiers of step 310. In preferred embodiments of the instant invention, user input will be received by a processor based device, such as a personal computer, coupled to the memory device. In other embodiments, the user input may be received by a processor based device that is in communication with the memory device via a network such as the internet.

In step 340 the availability of one or more replacement parts will be indicated based at least on the known stock availability of the one or more replacement parts. By way of example, a processor based system, such as a computer, carrying out the steps of the method 300, may compare the list of known potential replacement parts for a given model identifier, as indicated by the user. This list of known potential replacement parts may then be compared to the set of known parts that are currently available in a warehousing stock stored in a stock database. The stock database may be queried using part identifiers to provide inventory information for comparison. Based on the comparison, the processor based system may generate an indication to the user as to which replacement parts for a particular model identifier are currently available.

In one embodiment, the stock database is stored separately from the memory device on which the model identifier and part identifier association information is stored. In another embodiment, the stored part identifier information may further comprise information regarding the stock availability of the specific part corresponding to the part identifier.

Figure 4:
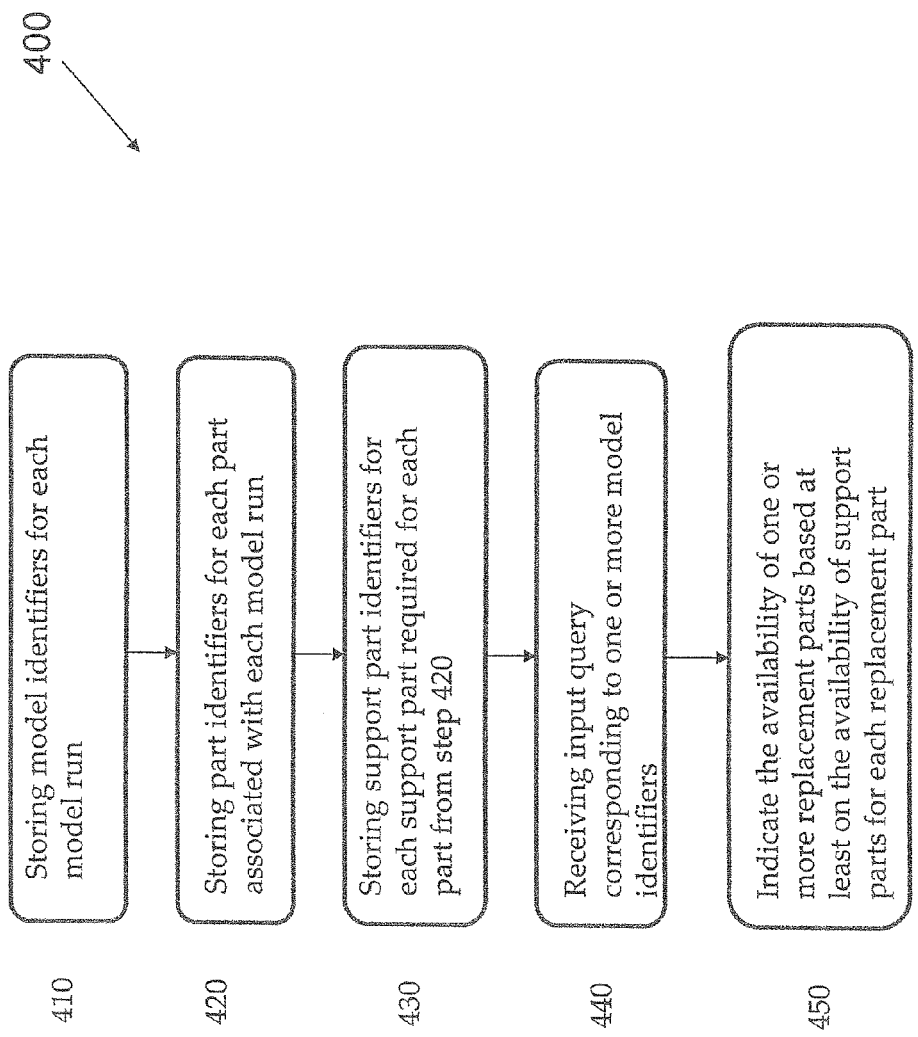
FIG. 4 is a flow diagram depicting the steps of a method for determining the availability of one or more replacement parts based at least on the availability of corresponding support parts according to one embodiment of the present invention.

FIG. 4 is a flow diagram of the steps of a method 400 for determining the availability of one or more replacement parts, based at least on the availability of supporting parts for each replacement part, according to one embodiment of the present invention. By way of example, a user may input into a processor based system an input query corresponding to one or more model identifiers. Based on the input received from the user, the processor based system may execute the method 400 to determine and indicate the availability of one or more replacement parts to the user.

Specifically, the method 400 begins in step 410 in which model identifiers for each model run are stored onto a tangible computer readable memory device (not shown). As discussed above with respect to the method 300, the memory device may comprise essentially any tangible computer readable memory, including but not limited to optical, magnetic or flash memory, etc. The method 400 proceeds into step 420 in which part identifiers are then stored to the memory device. In one embodiment of the invention, the stored part identifiers are each associated with one or more model identifier (from step 410). In preferred embodiments, each part is associated with one model identifier. However, in some embodiments, wherein a particular part may be used in multiple model runs, the part identifier may be associated with multiple model identifiers.

In step 430 support part identifiers associated with each potential support part are stored onto the memory or a second memory. In preferred embodiments, the support part identifier information will be associated with the part identifier information such that each support part identifier will be associated with one or more part identifier.

In step 440, an input query corresponding to one or more model identifiers is received. The input query of step 440 could be received from essentially any information source including a program or software function; however, in preferred embodiments, the input query will be received from a user via an input peripheral such as a keyboard or mouse, electrically communicated with a processor based system such as a computer. In preferred embodiments, the input query will function as a query regarding which replacement part alternatives are available for the one or more model identifiers corresponding to those of the input query.

Specifically, in response to receiving an input model identifier, the memory may return one or more part identifiers associated with that model identifier. Querying the memory or a second memory with a retrieved part identifier may return one or more support part identifiers. In the event that no part identifier or support identifier is returned, user will be notified that no substitution is available.

The part and support part identifiers found to be associated to the input model identifier will be supplied to a stock database to determine the inventory status of the parts and support parts. The stock database contains information regarding whether a part or a support part is in stock.

In one embodiment, the stock database is stored separately from the memory device on which the association information of model identifier, part identifier, and support part identifier is stored.

In step 450, an indication of the availability of one or more replacement parts will be made, wherein the indication will be based at least on the availability of support parts for each of the replacement parts.

In preferred embodiments of the invention, those replacement parts in which all corresponding parts are available will be indicated as available.

The invention claimed is:

1. A computer-implemented method for determining the availability of a substitution part, the method comprising:
   receiving an input model identifier;
   retrieving from a first memory device, in response to the receiving of the input model identifier, a part identifier associated with the model identifier,
   wherein the first memory device is a first tangible computer-readable medium;
   retrieving from a second memory device, in response to the receiving of the part identifier, a support part identifier associated with the part identifier,
   wherein the second memory device is a second tangible computer-readable medium;
   querying a database for the availability of a part corresponding to the part identifier and for the availability of a support part corresponding to the support part identifier; and
   indicating to a user the part identifier and the support part identifier associated with the input model identifier in the event the querying indicates that both the part and the support part are available,
   wherein the indicating to a user the part identifier and the support part identifier associated with the input model identifier further comprises indicating to the user the part identifier and the support part identifier only if both the part identifier and the support part identifier associated with the part identifier are available.

2. The method of claim 1, further comprising:
   indicating to the user the availability of the part and the support part.

3. The method of claim 1, wherein retrieving a part identifier further comprises retrieving at least an additional part identifier.

4. The method of claim 1, wherein retrieving a support part identifier further comprises retrieving at least an additional support part identifier.

5. The method of claim 1, wherein the first memory device and the second memory device are the same device.

6. The method of claim 1, wherein the support part is a component of the part.

7. The method of claim 1, further comprising indicating to a user that the part is available only if all supports parts associated with the parts are available.

8. A computer-implemented method for determining the availability of one or more substitution parts, the method comprising:
   storing one or more model identifiers to a memory device, wherein the memory device is a tangible computer-readable medium;
   storing a plurality of part identifiers to the memory device, wherein each one of the plurality of part identifiers is associated with one or more of the model identifiers;
   storing a plurality of support part identifiers to the memory device, wherein each one of the plurality of support part identifiers is associated with one or more of the plurality of part identifiers;
   receiving one or more input model identifiers from a user, wherein each of the one or more input model identifiers correspond to at least one of the one or more model identifiers stored on the memory device;
   identifying the plurality of part identifiers associated with the one or more model identifiers that correspond with the one or more input model identifiers received from the user;
   identifying the plurality of support part identifiers associated with the one or more of the identified plurality of part identifiers;
   querying a database for the availability of a plurality of parts corresponding to the plurality of part identifier and for the availability of a plurality of support parts corresponding to the plurality of support part identifier; and
   indicating to a user a subset of the plurality of part identifiers corresponding to the available parts and a subset of the plurality of support part identifiers corresponding to the available support parts, which are associated with the one or more input model identifiers.

9. The method of claim 8, wherein the support part is a component of the part.

10. The method of claim 8, wherein the indicating to a user a subset of the plurality of part identifiers corresponding to the available parts and a subset of the plurality of support part identifiers corresponding to the available support parts, which are associated with the one or more input model identifiers, further comprises indicating to the user the subset of the plurality of part identifiers and the subset of the plurality of support part identifiers only if both the part identifiers and the support part identifiers associated with the part identifiers are available.

11. The method of claim 8, further comprising indicating to a user that the parts are available only if all supports parts associated with the parts are available.

12. A processor based system for use in determining the availability of one or more substitution parts, the processor based-system comprising a processor for carrying out the steps of:
   storing one or more model identifiers; storing a plurality of part identifiers, wherein each one of the plurality of part identifiers is associated with one or more of the model identifiers;
   storing a plurality of support part identifiers, wherein each one of the plurality of support part identifiers is associated with one or more of the plurality of part identifiers;
   receiving one or more input model identifiers from a user, wherein each of the one or more input model identifiers correspond to at least one of the one or more model identifiers stored on the memory device;
   identifying the plurality of part identifiers associated with the one or more model identifiers corresponding to the one or more input model identifiers received from the user;
   storing information regarding the availability of one or more replacement parts, wherein each of the one or more replacement parts is associated with one or more of the plurality of part identifiers;
   identifying the plurality of support part identifiers associated with the one or more of the identified plurality of part identifiers;
   storing information regarding the availability of one or more support parts, wherein each of the one or more support parts is associated with at least one of the plurality of support part identifiers; and indicating, to the user, the availability of one or more replacement parts, based at least on the availability of the one or more support parts associated with at least one of the plurality of support part identifiers.

13. The system of claim 12, wherein the support part is a component of the part.

14. The system of claim 12, wherein the processor is further adapted to indicate to the user the availability of the one or more replacement parts only if the support part identifiers associated with the part identifiers are available.

15. The system of claim 12, wherein the processor is adapted to indicate to the user that the one or more replacement parts are available only if each support parts associated with the replacement parts are available.

* * * * *

UNITED STATES PATENT AND TRADEMARK OFFICE
CERTIFICATE OF CORRECTION

PATENT NO. : 8,495,088 B2
APPLICATION NO. : 13/246852
DATED : July 23, 2013
INVENTOR(S) : Mooney Page 1 of 1

It is certified that error appears in the above-identified patent and that said Letters Patent is hereby corrected as shown below:

In the CLAIMS:
Claim 7, column 5, line 57, delete "supports" and insert --support--.
Claim 11, column 6, line 38, delete "supports" and insert --support--.

Signed and Sealed this
Third Day of December, 2013

Margaret A. Focarino
*Commissioner for Patents of the United States Patent and Trademark Office*